(12) United States Patent
Simmons et al.

(10) Patent No.: US 7,230,181 B2
(45) Date of Patent: Jun. 12, 2007

(54) CORD HOLDING DEVICE AND METHOD OF USE

(76) Inventors: Joseph William Simmons, 404 Audrey La., New Bern, NC (US) 28560; Randall Wade Hatfield, P.O. Box 12133, New Bern, NC (US) 28560

( * ) Notice: Subject to any disclaimer, the term of this patent is extended or adjusted under 35 U.S.C. 154(b) by 41 days.

(21) Appl. No.: 11/088,170

(22) Filed: Mar. 23, 2005

(65) Prior Publication Data

US 2005/0230143 A1    Oct. 20, 2005

Related U.S. Application Data

(60) Provisional application No. 60/562,708, filed on Apr. 16, 2004.

(51) Int. Cl.
*H01R 13/72* (2006.01)

(52) U.S. Cl. .......... 174/66; 174/56; 174/154; 174/138 G; 439/4; 439/501

(58) Field of Classification Search .......... 174/66, 174/154, 138 G, 56; 220/241; 439/4, 501
See application file for complete search history.

(56) References Cited

U.S. PATENT DOCUMENTS

| | | | | |
|---|---|---|---|---|
| 355,491 | A | * | 1/1887 | Wiley .......... 248/61 |
| 810,004 | A | * | 1/1906 | Tabler .......... 248/61 |
| 2,084,953 | A | * | 6/1937 | Gibson .......... 174/53 |
| 2,167,541 | A | | 7/1939 | Young |
| 2,231,001 | A | | 2/1941 | Engstrom |
| 2,438,143 | A | * | 3/1948 | Brown .......... 191/12 R |
| 2,746,112 | A | | 5/1956 | Simon |
| 2,943,138 | A | | 6/1960 | Reager |
| 3,013,105 | A | | 12/1961 | Craig |
| 3,042,739 | A | | 7/1962 | Craig |
| 3,113,996 | A | | 12/1963 | Sanford |
| 3,257,497 | A | | 6/1966 | Chase |
| 3,689,868 | A | | 9/1972 | Snyder |

(Continued)

FOREIGN PATENT DOCUMENTS

GB    2121616    12/1983

OTHER PUBLICATIONS

"Cord Rope and Chain Storage Wrap", 1 page, website: http://www.allbrightideas.com/ICW-1_cord_wrap.asp, printed Dec. 3, 2004.

*Primary Examiner*—Jinhee Lee
(74) *Attorney, Agent, or Firm*—Coats & Bennett, PLLC

(57) ABSTRACT

A cord holding device and method of use. An embodiment of the device includes a sheet of material having a turned end. The turned end is selectively positionable between a closed orientation and an open orientation. In the open orientation, an opening is formed between the turned end and the sheet to allow for the cord to be inserted within an interior section. In the closed orientation, the turned end wraps around the cord to retain it within the device. A method of using the device comprises mounting the device to a position to receive the cord. A holding section is unturned an amount to allow for the cord to be inserted within the interior section of the holding section. After cord insertion, the holding section re-turns and wraps around the cord.

19 Claims, 5 Drawing Sheets

U.S. PATENT DOCUMENTS

| | | |
|---|---|---|
| 4,067,526 A | 1/1978 | Storer |
| 4,285,486 A | 8/1981 | Von Osten et al. |
| 4,335,863 A | 6/1982 | Rapps |
| D275,175 S | 8/1984 | Rolli, Jr. |
| 4,921,444 A | 5/1990 | Cama |
| 5,071,367 A | 12/1991 | Luu |
| 6,425,165 B2 | 7/2002 | Koppang |
| 6,503,097 B2 * | 1/2003 | Archambault ............... 439/501 |
| 6,793,523 B1 | 9/2004 | Wei |
| 2002/0061678 A1 | 5/2002 | Archambault |
| 2004/0108126 A1 | 6/2004 | Kaloustian |

* cited by examiner

CORD HOLDING DEVICE AND METHOD OF USE

RELATED APPLICATION

This application claims priority to Provisional U.S. Patent Application No. 60/562,708 filed Apr. 16, 2004, which is incorporated herein by reference.

BACKGROUND

Cord organization has become more difficult as additional machines and devices make their way into home and business use. These cords can become unmanageable due to many factors including length and number. Unorganized cords may not only be visually unappealing and cumbersome, but they may also lead to preventable injuries. Creating a safe, efficient and aesthetically pleasing environment is important to many businesses and individuals.

Some cords become easily tangled alone along their length or with other cords. The process of untangling these cords may lead to undue frustration and wasted time. Also, locating a specific cord in a tangled mass of cords can be problematic and physically difficult especially when cords are located in a restricted space.

A large amount of time and resources is devoted to making homes and businesses aesthetically pleasing. Unsecured cords can be visually unpleasant and can give an entire home or office an unorganized appearance. In some homes and businesses, it is important to have an environment that appears organized and shows attention to detail. Keeping the cords off the floor adds to the aesthetically pleasing appearance.

Cords can also be hazardous to safety when inadvertently moving objects themselves or interfering with the movement of individuals and objects. Because tripping and falling over cords is common and can lead to serious injuries, it can be important for owners of homes and businesses to prevent their family, pets, employees and visitors from coming into contact with cords. Cords may also move other objects or get in the way and cause injury to valuable equipment and objects. By taking active steps to secure cords that can be potentially hazardous, homes and businesses may be able to avoid human injury and damage to equipment.

SUMMARY

The present invention is directed to embodiments of a device to hold a cord. The device may be constructed from a single sheet of resilient material having a turned end. The turned end is biased towards a first position having a turned orientation. The end may also be forced to an open orientation forming an opening for insertion of a cord into an interior section.

One method of using the device may include unturning a holding section and forming an opening between the holding section and a base section. The cord may then be inserted into the interior section of the holding section. Finally, the cord may be released causing the holding section to re-turn and reduce the size of the opening and prevent inadvertent removal of the cord.

DETAILED DESCRIPTION

Figure 1:
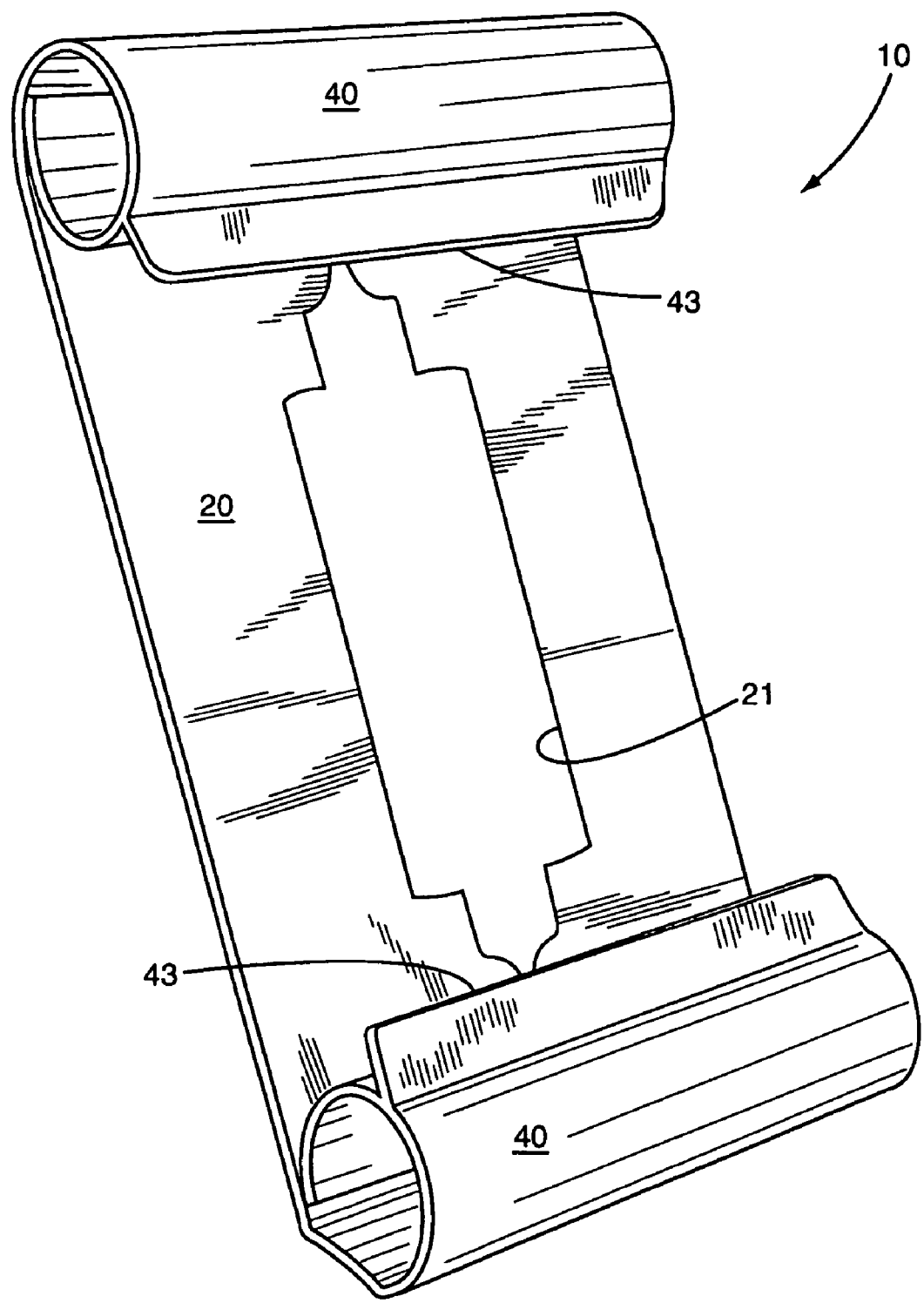
FIG. 1 is a perspective view of the device according to one embodiment of the present invention.
Figure 2:
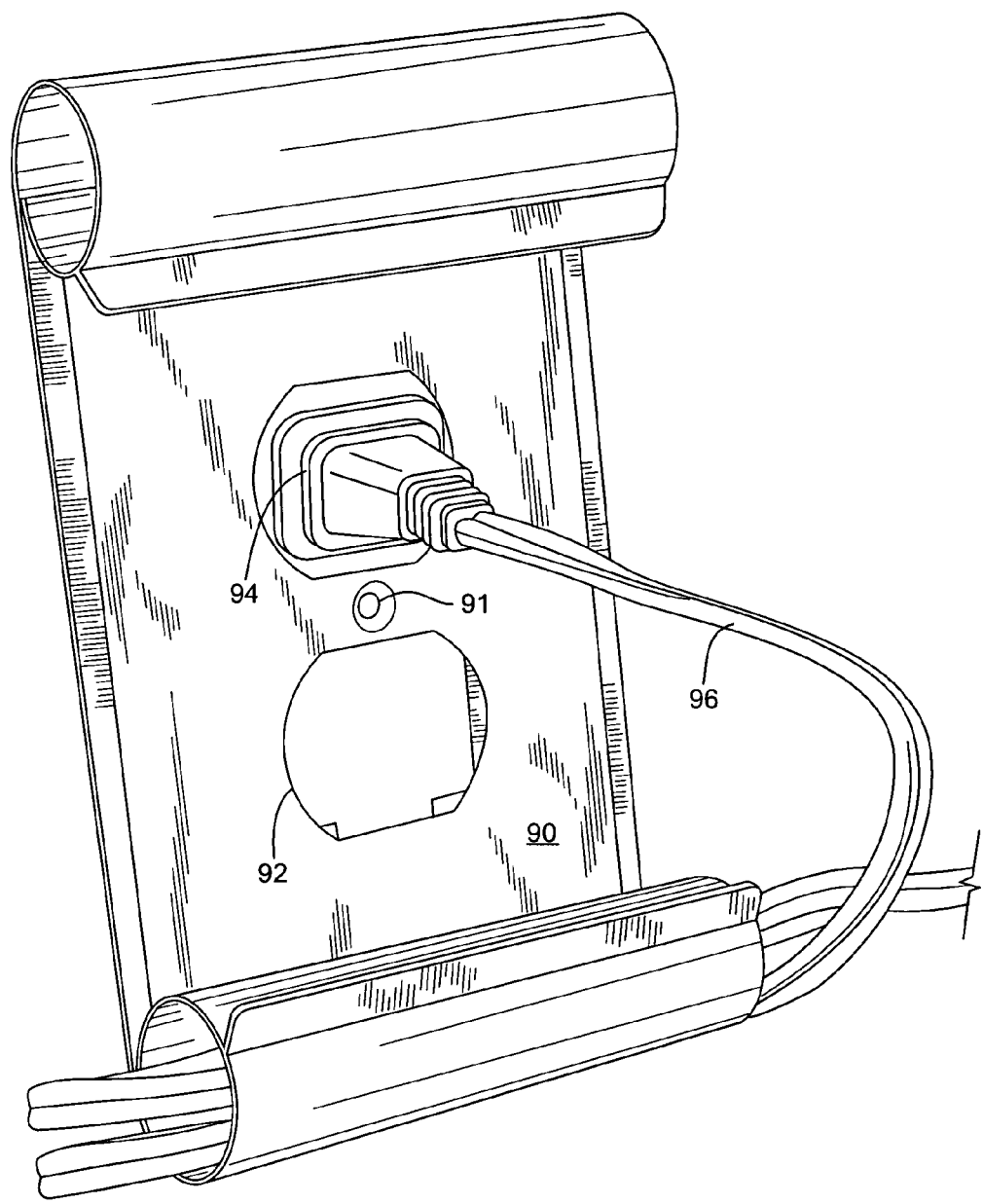
FIG. 2 is a perspective view of the device positioned partially behind a face plate according to one embodiment of the present invention.

The present invention is directed to embodiments of a cord holding device. FIG. 1 illustrates an embodiment of the device, generally denoted as 10, having a base section 20 and a holding section 40. The holding section 40 is selectively positionable between a closed orientation and an open orientation. FIG. 2 illustrates the device 10 with the base section 20 positioned behind a face plate 90 of an electrical outlet with the holding section in the closed orientation to hold a cord 96.

Figure 3:
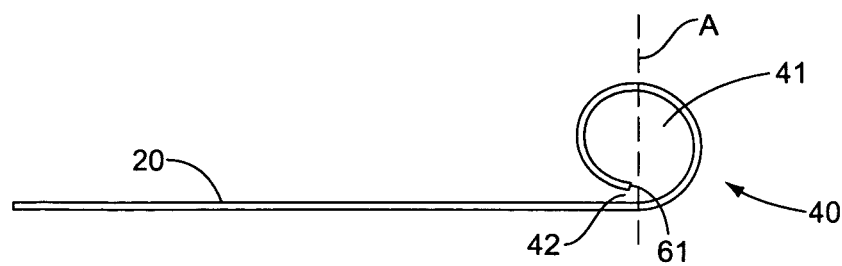
FIG. 3 is a side view of the device in a closed orientation according to one embodiment of the present invention.
Figure 4:
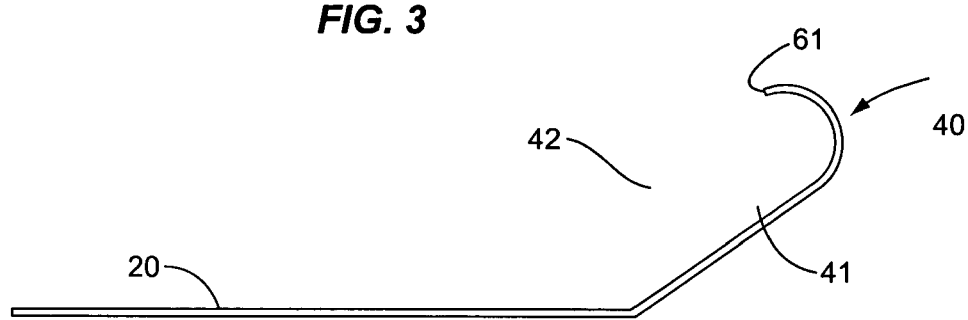
FIG. 4 is a side view of the device in an open orientation according to one embodiment of the present invention.

The device 10 in this embodiment is constructed from a single piece of material. The base section 20 comprises a first area of the material, and the holder section 40 comprises a second area. In one embodiment, the holder section 40 is formed by an area of the material adjacent to an edge 61. The material is resilient and provides for the holder section 40 to be in the closed orientation when no exterior force is applied (FIG. 3), and the open, extended orientation when acted upon by an exterior force (FIG. 4). Once the force is removed, the holder section 40 returns towards the closed orientation. The device 10 may be constructed of a variety of materials, such as extruded or molded plastic, and aluminum.

The base section 20 provides for securing the device 10 to a mounting surface. In the embodiment illustrated in FIGS. 1 and 2, the base section 20 is substantially flat to mount behind the face plate 90 or receptacle. An opening 21 may extend through the base section 20 for insertion of one or more plugs 94 into the electrical outlets. A back side of the base section 20 may be equipped with adhesive, VELCRO, magnetic strips, and other mounting means to attach the device 10 to the mounting surface. Additionally, fasteners (not illustrated)) may mount the base section 20 to the mounting surface.

The holder section 40 holds and releases the cord 96 from the device 10. The holder section 40 is biased towards the closed orientation as illustrated in FIG. 3. The closed orientation has a turned configuration forming an interior section 41 sized to hold the cord 96. The edge 61 is positioned in proximity to the line A that marks the beginning of the holder section 40. In this embodiment, the turned configuration forms a cylindrical section that forms about a 360° turn. A gap 42 is formed at the edge 61 to facilitate insertion of the cord 96.

FIG. 4 illustrates the holder section 40 in the open, extended orientation. The edge 61 of the holder section 40 is substantially spaced away from the base section 20 forming an enlarged gap 42 and interior section 41 for insertion of the cord 96. Once the cord 96 is inserted and the exterior force is released, the holder section 40 will return towards the closed orientation. The size of the cord 96 may prevent a complete return, resulting in the holder section 40 applying a squeezing force to maintain the cord 96. Further, the gap 42 may be larger than in the fully closed orientation as illustrated in FIG. 3. If the cord 96 is smaller than the interior section 41 in the closed orientation, the holder section 40 substantially surrounds the cord 96 to prevent inadvertent removal and the gap 42 will be about the same as in the closed orientation.

Figure 5:
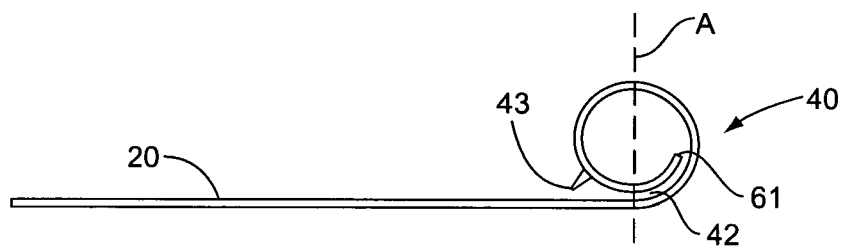
FIG. 5 is a side view of the device in a closed orientation according to one embodiment of the present invention.
Figure 6:
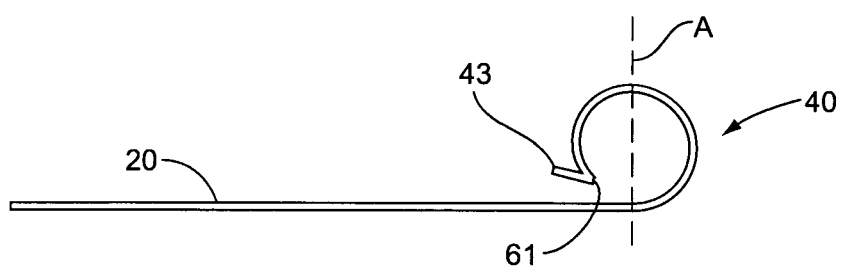
FIG. 6 is a side view of the device in a closed orientation according to one embodiment of the present invention.

Another embodiment is illustrated in FIG. 5 with the holder section 40 in the closed orientation. In this embodiment, the turn exceeds 360° as the edge 61 wraps beyond the beginning of the holder section 40 identified by line A. In this embodiment, a limited section of the holder section 40 has a two-ply construction. FIG. 6 illustrates another embodiment in which the turn is less than 360° with the edge 61 not fully returning to the beginning of the holder section 40 identified at line A. In one embodiment, the amount of turn is at least 270° which prevents the gap 42 from being too large such that the cord 96 could inadvertently be removed from the device 10.

Figure 7:
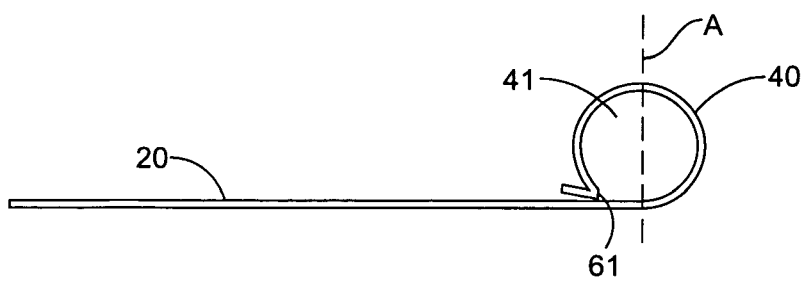
FIG. 7 is a side view of the device in a closed orientation according to one embodiment of the present invention.

The size of the gap 42 formed in the closed orientation may vary depending upon the embodiment. FIG. 3 illustrates one embodiment having a small gap 42 positioned directly beyond the edge 61. The embodiment of FIG. 5 illustrates an embodiment with a larger gap 42. FIG. 7 illustrates another embodiment that does not include a gap 42. The edge 61 of the holder section 40 contacts the base section 20.

Figure 11:
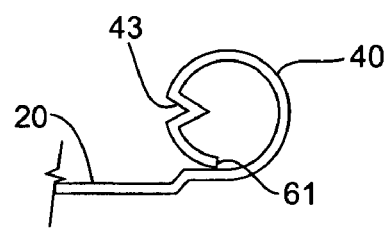
FIG. 11 a side view of the device in a closed orientation according to one embodiment of the present invention.
Figure 12:
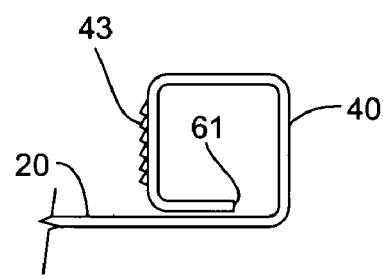
FIG. 12 a side view of the device in a closed orientation according to one embodiment of the present invention.

A grip 43 may extend outward from the holder section 40. The grip 43 provides for grasping by a user to apply an opening force to the holder section 40 to move it towards the open orientation. In one embodiment as illustrated in FIG. 1, the grip 43 is positioned at a mid-area of the holder section 40. FIG. 6 illustrates another embodiment with the grip 43 at the edge 61 of the holder section 40. The grip 43 of FIG. 6 also functions as a guide to assist in inserting the cord 96 into the interior section 41. The angled configuration funnels the cord 96 towards the edge 61 and into the interior section 41. FIG. 11 illustrates another grip 43 formed by the holder section 40. An indent forms a surface that is gripped by the user to move the holder section 40 towards the open orientation. Various sizes and shapes of indents may be used to form the grip 43. FIG. 12 illustrates another embodiment with a section of the holder section 40 having a roughened surface forming the grip 43. Again, the user is able to grasp the holder section 40 and apply a force to move it towards the open orientation. The grip 43 of FIG. 12 may be constructed of a softer material than the remainder of the holder section 40.

In use, the device 10 is mounted in a location where cords 96 are present, such as an electrical receptacle, computer area, television setting, telephone kiosk, etc. Prior to cord 96 insertion, the holder section 40 assumes the closed orientation. Moving the holder section 40 to the open orientation may be caused by the user grasping the holder section 40 and/or grip 43 and applying a force, or forcing the cord through the gap 42 and hence causing the holder section 40 to open. Once the cord 96 is inserted, the resiliency of the material causes the holder section 40 to return towards the closed orientation to maintain the cord 96 attached within the device 10.

Removal of the cord 96 from the holder section 40 is possible in a number of ways. The user may grasp the holder section 40 and/or grip 43 and move the holder section 40 towards the open orientation thus allowing for cord removal. Similarly, the user may grasp the cord 96 and pull thus applying an opening force to move the holder section 40. In another embodiment, the cord 96 can be slid laterally and removed from the holder section without actually moving the holder section 40 towards the open orientation.

The extent that the holder section 40 is moved towards the open orientation is dependent upon the size of the cord 96. For small cords, the holder section 40 may only be moved a limited amount to form a gap 42 sized to receive the cord 96 into the interior section 41. For larger cords, the holder section 40 is moved a more substantially amount.

The term "cord" is used broadly herein to refer to the class of objects that may be maintained by the device 10. Specific types of cords may include cables, electrical cords, computer cables, telephone cords, Christmas lights, fiber optic cables, etc. This term is used herein to denote a general classification and is understood to include a wide variety of members. The device 10 is designed to hold a single strand of cord 96, or a gathered bundle (FIG. 2).

Figure 10:
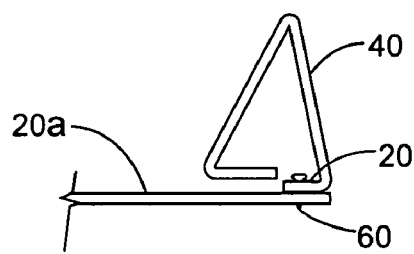
FIG. 10 is a side view of the device in a closed orientation according to one embodiment of the present invention.

The base section 20 and holder section 40 may have a variety of sizes and widths depending upon the application. The embodiment of FIGS. 1 and 2 illustrate a larger base section 20 that extends between two separate holder sections 40 formed at each longitudinal end of the device 10. FIG. 7 illustrates an embodiment with a smaller base section 20. The base section 20 may have a length greater than or less than the holder section 40. FIG. 10 illustrates another embodiment having a small base section 20 that leads into the holder section 40. In this embodiment, an additional base 20a is fastened to the base section 20 via a fastener 60. Fasteners 60 may include rivets, screws, adhesives, etc.

The holder section 40 has a turned orientation to capture and maintain the cord 96. The turned orientation may be form a substantially circular cross-sectional holder section 40 as illustrated in FIGS. 3, 5, 6, 7, and 11. The turned orientation may also have substantially flat sides, such as the embodiments illustrated in FIGS. 10 and 12. In one embodiment (not illustrated), the turned section forms a polygonal sphere.

Figure 8:
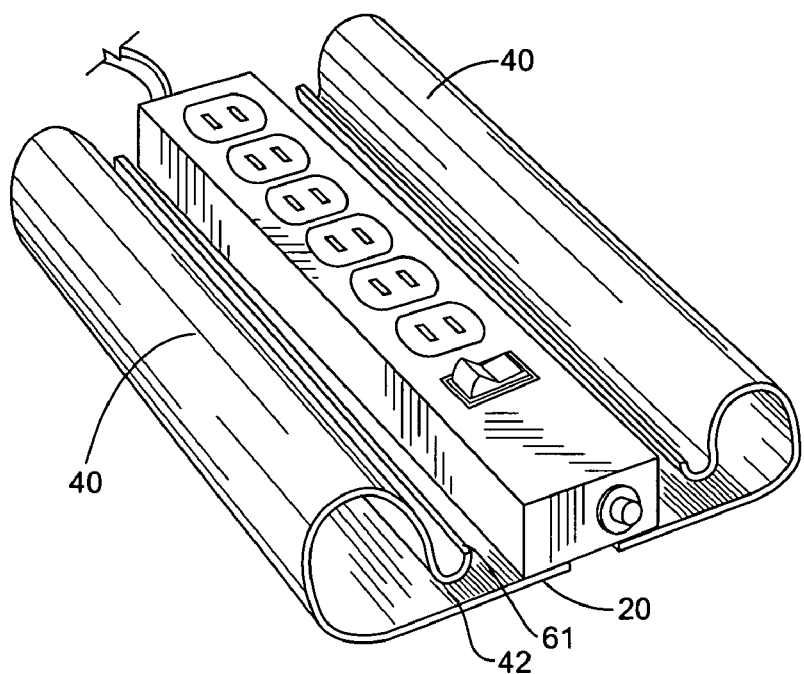
FIG. 8 is a perspective view of the device in use with a power strip according to one embodiment of the present invention.

FIG. 8 illustrates another embodiment having a turned configuration adjacent to the edge 61. The curve functions as both a grip to contact the holder section 40, and as a guide for inserting the cord 96.

Figure 13:
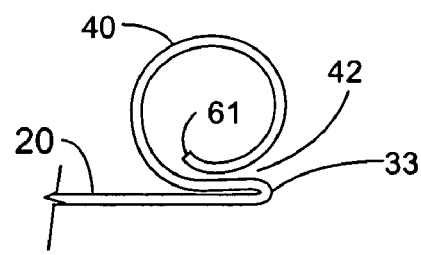
FIG. 13 a side view of the device in a closed orientation according to one embodiment of the present invention.

FIG. 13 illustrates another embodiment having a holder section 40 oriented in an opposite direction. An intermediate bend 33 between the base 20 and holder section 40 causes the turned orientation to be opposite from the previous embodiments. The gap 42 is positioned away from the base section 20. This embodiment functions in substantially the same manner by moving between the closed and open orientation to maintain a cord 96.

Figure 9:
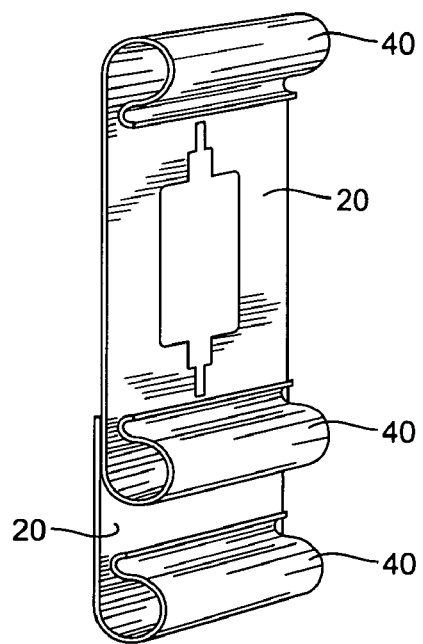
FIG. 9 is a perspective view of two separate devices arranged in an overlapping configuration according to one embodiment of the present invention.

The device 10 may be used in a variety of settings. FIG. 2 illustrates the device 10 in use with an electrical receptacle. This embodiment features two holder sections 40 on the longitudinal edges of the base section 20. FIGS. 3-7 illustrate another embodiment having a single holder section 40. FIG. 8 illustrates an embodiment for use with a power strip. This embodiment has a length sized to conform with the length of the power strip and holder sections 40 extending along the lateral sides of the base section 20. FIG. 9 illustrates an embodiment with multiple holder sections 40 positioned on the same side of the base section 20. In this embodiment, a first device 10 such as that illustrated in FIG. 1 is positioned over a second device as illustrated in FIGS. 3-7. This configuration provides for additional cord storage capacity.

When used with an electrical receptacle, the device 10 may be connected in a number of different manners. In the embodiment illustrated in FIG. 2, the faceplate 90 is removed from the electrical receptacle (not illustrated) by removal of a fastener from the mounting hole 91. The device 10 is inserted over the receptacle with the device opening 21 positioned to not interfere with the outlets. The faceplate 90 is then re-mounted over the device 10 with the openings 92 aligning with the outlets in the receptacle to receive the plug 94. The excess cord 96 is bundled and maintained within the holder section 40. In another embodiment, the entire receptacle is removed from the wall and the device 10 is positioned behind the receptacle. Fasteners that hold the receptacle in position on the wall also function to hold the device 10. Another embodiment includes the receptacle being loosened an adequate amount to allow for the device 10 to be positioned behind the receptacle. Once in position, the receptacle is firmly reattached.

In one embodiment, the holder section 40 may have a tapered configuration with the thickness of the holder section 40 decreasing towards the edge 61. In one embodiment, the entire holder section 40 has a tapering thickness from the inner section indicated by line A to the edge 61. In another embodiment, a limited section of the holder section 40 is tapered. In one embodiment, an inner section of the holder section 40 has a thickness of about 0.050 inches and tapers to a thickness of about 0.035 inches One embodiment features a combined device 10 and faceplate 90. In this design, the base section 20 also functions as a faceplate to extend over the outlets in the electrical receptacle. The holding section 40 extends outward from what is essentially the faceplate and operates in the same manner as the other embodiments.

The present invention may be carried out in other specific ways than those herein set forth without departing from the scope and essential characteristics of the invention. In one embodiment, the holding section 40 may have a width that is different than the base section 20. In one specific embodiment, the width of the holding section 40 tapers inward. The present embodiments are, therefore, to be considered in all respects as illustrative and not restrictive, and all changes coming within the meaning and equivalency range of the appended claims are intended to be embraced therein.

What is claimed is:

1. A device for use with a receptacle to hold a cord comprising a sheet of resilient material having a base section with a substantially flat orientation and a turned end, the turned end having a tapered thickness and forming a holding section to retain and partially conceal a bundle of the cord, the sheet being movable between open and closed orientations, and an opening within the base section to extend around the receptacle; and wherein the turned end has at least 360° of turn.

2. The device of claim 1, wherein the turned end comprises a two-ply construction.

3. The device of claim 1, further comprising a grip positioned on the turned end to exert a force to move the device from the closed orientation towards the open orientation.

4. The device of claim 1, further comprising a gap formed between the base section and the turned end.

5. The device of claim 1, wherein the tapered thickness extends along the entirety of the holding section.

6. The device of claim 1, wherein the base section extends completely around the receptacle.

7. A device to hold a bundle of cords at a receptacle comprising a base section and a coil section, the base section being substantially flat to fit along the receptacle and includes an opening to extend over a receptacle outlet, the coil section formed at an end of the base section and being biased towards a coiled orientation to retain the bundle of cords, a tip of the coil section facing towards one of the base section and the coil section in the coiled orientation, and facing away from one of the base section and coil section in an uncoiled orientation to receive the bundle of cords, the base section and the coil section constructed from a sheet of resilient material; and wherein the coiled section has at least 360° of turn.

8. The device of claim 7, further comprising a gap formed between the tip and the base section in the coiled orientation.

9. The device of claim 7, further comprising a gap formed between the tip and the base section in the coiled orientation.

10. The device of claim 7, wherein the coil section has a substantially circular cross-sectional shape.

11. The device of claim 7, wherein the coil section has a substantially straight section.

12. The device of claim 7, wherein at least a portion of the coil section has a tapering thickness.

13. A device to hold a bundle of cords at a receptacle comprising:
 a base section including an opening that aligns with the receptacle; and the base section being substanially flat; and
 a coil section adjacent to the base section and being resiliently constructed to be movable between a first cylindrical orientation that encircles the bundle of cords and a second elongated orientation to receive the bundle of cords;
 the base section and the coil section being formed from a single material sheet; and wherein the coil section has at least 360° of turn.

14. The device of claim 13, wherein the first cylindrical orientation forms an enclosed interior section to contain the bundle of cords.

15. The device of claim 13, wherein the holding section has a tapered thickness.

16. The device of claim 15, wherein an entire length of the holding section is tapered.

17. The device of claim 13, further comprising a gap formed between the coil section and the base section in the first cylindrical orientation.

18. A device to hold a cord comprising a sheet of resilient material having a base section and a coiled end that forms a holding section to retain and partially conceal a bundle of cords, the base section being substantially flat and including an outer frame that extends around the receptable and an opening sized to align with the receptacle, the sheet being biased towards a closed orientation having an enclosed interior section to encircle and contain the bundle of cords and being movable to an opening orientation upon application of an exterior force to the holding section; and wherein the closed orientation has at least 360° of turn.

19. The device of claim 18, wherein the holding section has a tapered thickness.

* * * * *